(12) United States Patent
Lim

(10) Patent No.: US 9,771,129 B2
(45) Date of Patent: Sep. 26, 2017

(54) BICYCLE CONTROL DEVICE

(71) Applicant: Shimano (Singapore) Pte. Ltd., Jurong Town (SG)

(72) Inventor: Guang Sheng Elson Lim, Singapore (SG)

(73) Assignee: SHIMANO (SINGAPORE) PTE. LTD., Jurong Town (SG)

( * ) Notice: Subject to any disclaimer, the term of this patent is extended or adjusted under 35 U.S.C. 154(b) by 27 days.

(21) Appl. No.: 13/923,603

(22) Filed: Jun. 21, 2013

(65) Prior Publication Data

US 2014/0373669 A1 Dec. 25, 2014

(51) Int. Cl.
*B62M 25/04* (2006.01)

(52) U.S. Cl.
CPC ........ *B62M 25/04* (2013.01); *Y10T 74/20612* (2015.01)

(58) Field of Classification Search
CPC ....... F16H 59/0278; G05G 1/04; B62M 25/04
USPC .................... 74/488, 489, 501.6, 502.2, 525
See application file for complete search history.

(56) References Cited

U.S. PATENT DOCUMENTS

| | | | |
|---|---|---|---|
| 4,611,500 A * | 9/1986 | Nagano | 74/489 |
| 4,974,469 A * | 12/1990 | Romano | 74/502.2 |
| 5,682,794 A * | 11/1997 | Shibata | B62K 23/06 74/142 |
| 6,161,448 A * | 12/2000 | Wang | 74/502.2 |
| 6,305,237 B1 * | 10/2001 | Ichida | B62M 9/122 474/101 |
| 8,042,427 B2 * | 10/2011 | Kawakami et al. | 74/502.2 |
| 2006/0053940 A1 * | 3/2006 | McLaughlin et al. | 74/502.2 |
| 2007/0137385 A1 * | 6/2007 | Cesur et al. | 74/501.6 |
| 2008/0098848 A1 | 5/2008 | Dal Pra' et al. | |
| 2008/0202277 A1 * | 8/2008 | Miki | 74/502.2 |
| 2008/0229863 A1 * | 9/2008 | Orrico et al. | 74/491 |
| 2009/0049945 A1 * | 2/2009 | Weiher | B62K 23/06 74/484 R |
| 2012/0255390 A1 * | 10/2012 | Warren et al. | 74/522 |
| 2013/0008280 A1 * | 1/2013 | Hsu | 74/522 |

FOREIGN PATENT DOCUMENTS

DE 1285898 B * 12/1968 ............... G05G 1/04

* cited by examiner

*Primary Examiner* — Vicky Johnson

(74) *Attorney, Agent, or Firm* — Global IP Counselors, LLP

(57) ABSTRACT

A bicycle control device is basically provided with a housing, a base member, a user operating member and a fixing member. The housing has an internal space. The base member is at least partially disposed in the internal space and pivotally arranged relative to the housing about a first axis. The user operating member is adjustably mounted to the base member and partially disposed in the internal space. The user operating member has a user contacting portion. The fixing member fixes the user operating member to the base member at one of at least a first position and a second position.

15 Claims, 10 Drawing Sheets

BICYCLE CONTROL DEVICE

BACKGROUND

Field of the Invention

This invention generally relates to a bicycle control device. More specifically, the present invention relates to a bicycle control device having a user operating member that is adjustable between at least two different positions.

Background Information

Bicycles are often provided with one or more bicycle control devices for controlling various components of the bicycle. Some bicycles are provided with a drive train having multiple gears that allows the rider to select a particular gear for a particular situation. A bicycle control device is usually provided for the rider to manually change gears of the drive train. This type of control devices is often called a bicycle shifter. In most cases, the bicycle control device is mounted to a part of a handlebar or a frame of the bicycle. Usually, the bicycle control device has a user operating member that is movably arranged to actuate a bicycle component. Sometimes the user operating member is adjustable. For example, U.S. Patent Application Publication No. 2008/0098848 discloses a bicycle shifter with an adjustable lever.

SUMMARY

Generally, the present disclosure is directed to a various features of a bicycle control device. A bicycle control device is disclosed that has a user operating member that is adjustable between at least two different positions.

In view of the state of the known technology and in accordance with a first aspect of the present disclosure, a bicycle control device is provided that basically comprises a housing, a base member, a user operating member and a fixing member. The housing has an internal space. The base member is at least partially disposed in the internal space and pivotally arranged relative to the housing about a first axis. The user operating member is adjustably mounted to the base member and partially disposed in the internal space. The user operating member has a user contacting portion. The fixing member fixes the user operating member to the base member at one of at least a first position and a second position.

In accordance with a second aspect of the present invention, the bicycle control device according to the first aspect is configured so that the user contacting portion is spaced from the first axis by a first distance with the user operating member fixed at the first position. The user contacting portion is spaced from the first axis by a second distance with the user operating member fixed at the second position. The first distance is different from the second distance.

In accordance with a third aspect of the present invention, the bicycle control device according to the second aspect further comprises a first axle defining the first axis, and the user operating member having an elongated hole through which the first axle passes.

In accordance with a fourth aspect of the present invention, the bicycle control device according to the third aspect is configured so that one of the base member and the user operating member has a guiding slot and the other of the base member and the user operating member has a guiding pin disposed in the guiding slot to prevent relative rotation between the base member and the user operating member.

In accordance with a fifth aspect of the present invention, the bicycle control device according to the first aspect is configured so that one of the base member and the user operating member includes at least a first fixing hole and a second fixing hole for selectively receiving the fixing member. The user operating member is disposed at the first position with the fixing member passing through the first fixing hole. The user operating member is disposed at the second position with the fixing member passing through the second fixing hole.

In accordance with a sixth aspect of the present invention, the bicycle control device according to the first aspect is configured so that the fixing member fixes the user operating member to the base member within the internal space of the housing.

In accordance with a seventh aspect of the present invention, the bicycle control device according to the first aspect further comprises a takeup member pivotally mounted to the housing about a takeup axis.

In accordance with an eighth aspect of the present invention, the bicycle control device according to the first aspect is configured so that the takeup axis is coaxial with the first axis.

Also other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
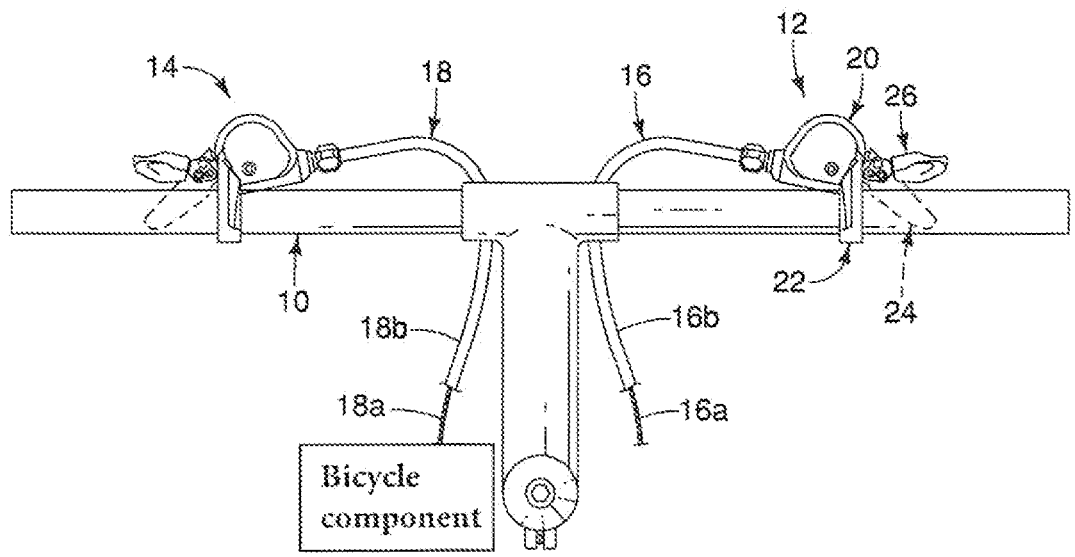
FIG. 1 is a top plan view of a bicycle handlebar that having two bicycle control devices that are each configured in accordance with on illustrative embodiment.

Referring initially to FIG. 1, a bicycle handlebar 10 is illustrated that is provided with a bicycle control device 12 and a bicycle control device 14 in accordance with a first illustrated embodiment. The bicycle control device 12 is arranged at a right side of the bicycle handlebar 10, while the bicycle control device 14 is arranged at a left side of the bicycle handlebar 10. In the first illustrated embodiment, the bicycle control device 12 is operatively coupled to a first gear changing device (not shown) via a first control cable 16, while the bicycle control device 14 is operatively coupled to a second gear changing device (not shown) via a second control cable 18. The gear changing devices are part of a conventional bicycle driving system that is used to shift a bicycle chain for changing speeds of a drive train (not shown) in a relatively conventional manner. Thus, the gear changing devices will not be shown or described herein. However, the bicycle control devices 12 and 14 can be used for operating other types of bicycle components (e.g., suspension devices) as needed and/or desired.

Preferably, as seen in FIG. 1, the control cables 16 and 18 are conventional bicycle operating cables that have an outer case covering an inner cable. In other words, each of the control cables 16 and 18 is a Bowden type cable that basically includes an inner cable slidably received within an outer case. For example, the control cable 16 has an inner cable 16a with an outer case 16b covering the inner cable 16a, while the control cable 18 has an inner cable 18a with an outer case 18b covering the inner cable 18a.

Also in the illustrated embodiment, the bicycle control devices 12 and 14 are essentially identical in operation, except that they are mirror images of each other, and they may have a different number of actuation (shift) positions. In other words, the bicycle control device 114 is identical to the bicycle control device 12, except for the bicycle control device 14 has been modified to be a mirror image and the number of gears that can be shifted has been changed. Thus, for the sake of brevity, only the bicycle control device 12 will be discussed and illustrated herein.

Figure 2:
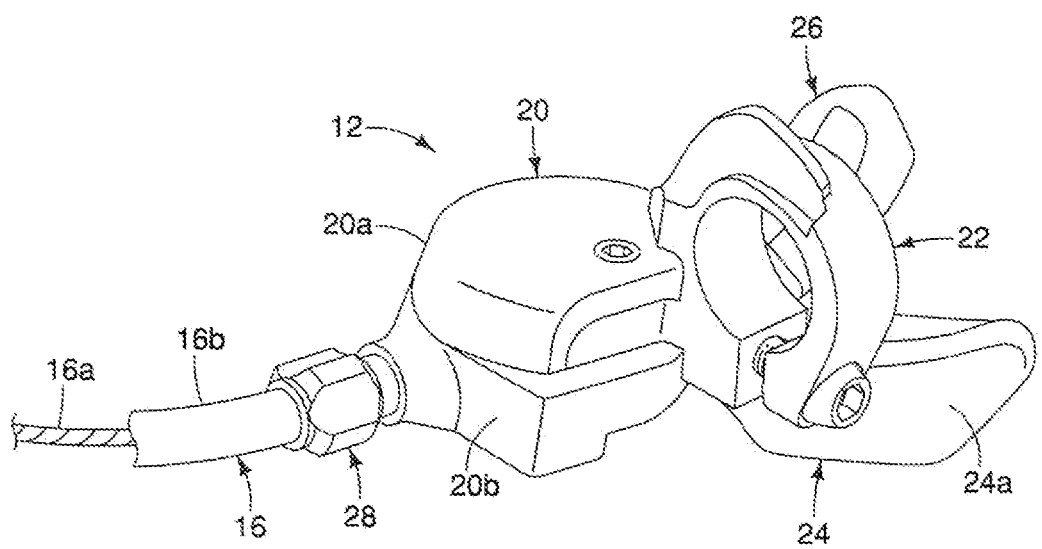
FIG. 2 is a perspective view of the bicycle control device that is mounted to the right hand side of the bicycle handlebar.
Figure 3:
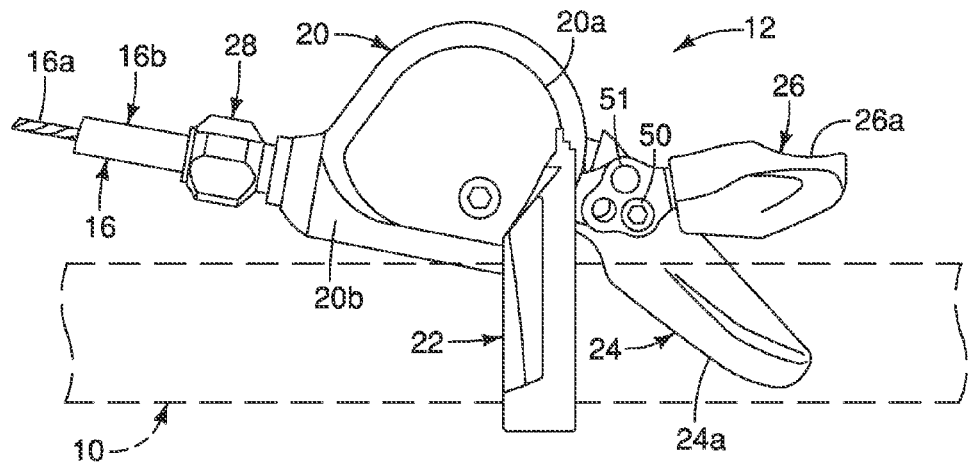
FIG. 3 is a top plan view of the bicycle control device illustrated in FIG. 2 with both of the first and second user operating members being at a rest position.
Figure 4:
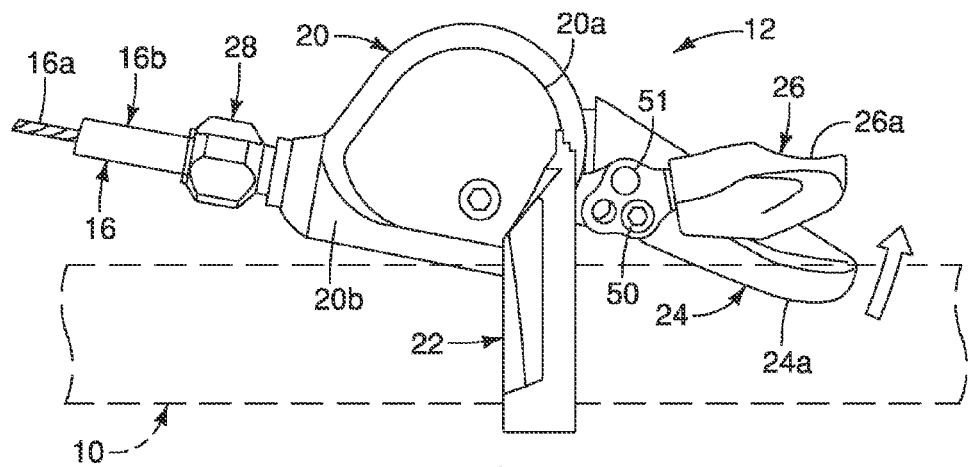
FIG. 4 is a top plan view of the bicycle control device illustrated in FIG. 3, but with the first user operating member moved to an operated position and the second user operating member being at the rest position.
Figure 5:
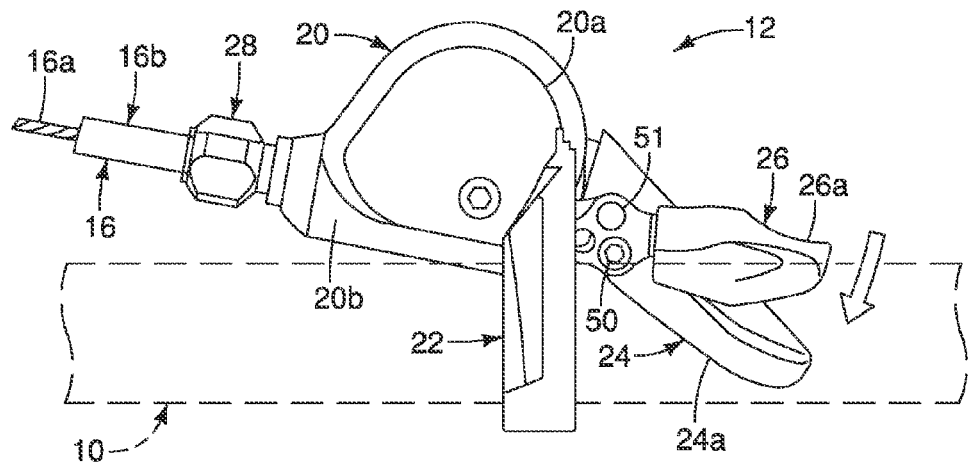
FIG. 5 is a top plan view of the bicycle control device illustrated in FIG. 3, but with the first user operating member being at the rest position and the second user operating member moved to an operated position.

As seen in FIGS. 2 to 5, the bicycle control device 12 comprises a housing 20 and a mounting member 22. The bicycle control device 12 further comprises a first user operating member 24 that moves relative to the housing 20 and the mounting member 22 between a rest position (FIGS. 2 and 3) and an operated position (FIG. 4). The first user operating member 24 has a user contacting portion 24a. In the illustrated embodiment, the bicycle control device 12 further comprises a second user operating member 26 that moves relative to the housing 20 and the mounting member 22 between a rest position (FIGS. 2 and 3) and an operated position (FIG. 5). The second user operating member 26 has a user contacting portion 26a. Here in the illustrated embodiment, the first user operating member 24 pulls the inner cable 16a as the first user operating member 24 is moved by the user from the rest position (FIGS. 2 and 3) to the operated position (FIG. 4). On the other hand, in the illustrated embodiment, the second user operating member 26 releases the inner cable 16a as the second user operating member 26 is moved by the user from the rest position (FIGS. 2 and 3) to the operated position (FIG. 5). As seen in FIG. 2, the housing 20 includes a first cover part 20a and a second cover part 20b. The first cover part 20a is releasably attached to the second cover part 20b by a plurality of screws (not shown) to cover internal parts. The mounting member 22 is configured to be attached to a part of a bicycle such as, for example, the handlebar 10 as seen in FIGS. 3 to 5. Preferably, a cable adjusting unit 28 is mounted to the housing 20 in a conventional manner.

Figure 6:
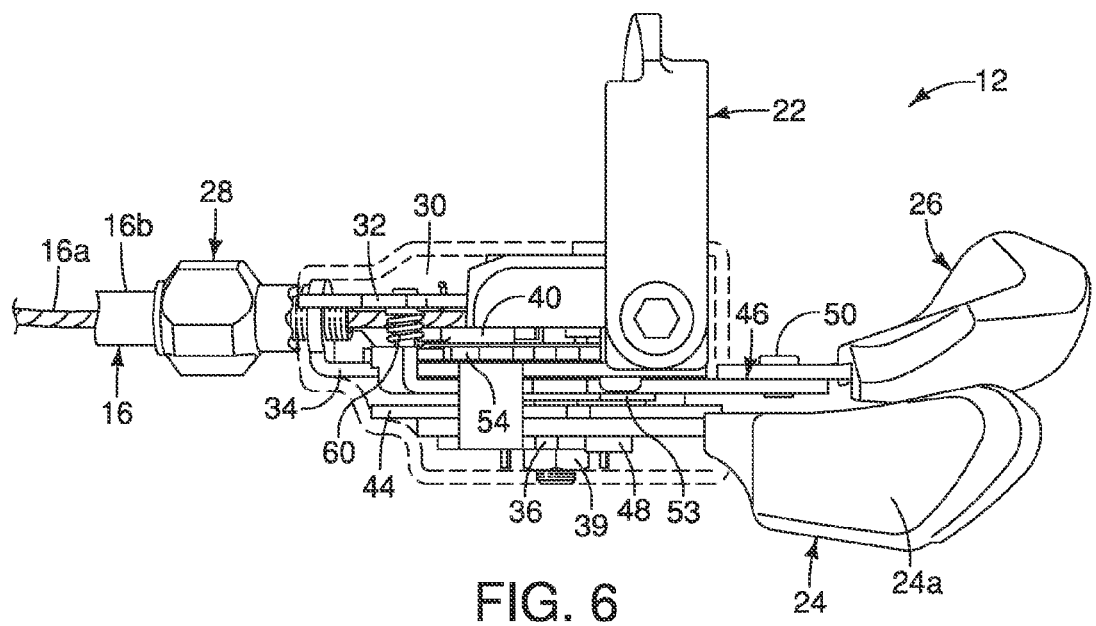
FIG. 6 is a rear side view of the bicycle control device illustrated in FIGS. 2 to 5, with the housing removed to show internal parts and both of the first and second user operating members being at the rest position.

As seen in FIG. 6, the housing 20 has an internal space 30 that houses various parts such a support structure that supports the internal parts. Here in the illustrated embodiment, the support structure of the bicycle control device 12 includes a first stationary support plate 32, a second stationary support plate 34 and a third stationary support plate 36. The bicycle control device 12 further comprises a first axle 38 that extends through the stationary support plates 32, 34 and 36. In the illustrated embodiment, as seen in FIG. 6, the first axle 38 is formed by a bolt that has a nut 39 screwed onto its threaded end for fixing the stationary support plates 32, 34 and 36 together. The first axle 38 defines a first axis A.

Figure 7:
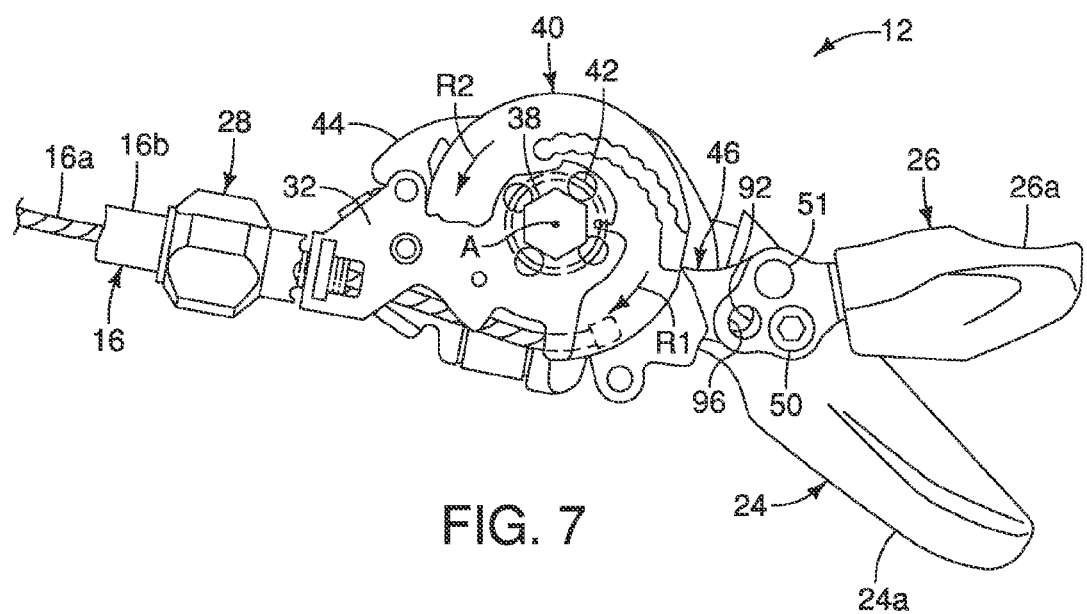
FIG. 7 is a top plan view of the bicycle control device illustrated in FIG. 6, with selected parts removed.

As seen in FIG. 7, the bicycle control device 12 further comprises a takeup member 40 that is pivotally mounted to the housing 20 about a takeup axis. In the illustrated embodiment, the first axle 38 defines the takeup axis. Thus, the takeup member 40 is mounted on the first axle 38 with the takeup axis being coaxial with the first axis A. A biasing element 42 is disposed between the first stationary support plate 32 and the takeup member 40 to bias the takeup member 40 in a first moving direction R1. In the illustrated embodiment, the biasing element 42 is a torsion spring having a coiled portion disposed around the first axle 38, a first end portion hooked on the first stationary support plate 32 and a second end hooked on the takeup member 40. One end of the inner cable 16a is attached to the takeup member 40 as seen in FIG. 7. In the illustrated embodiment, the first user operating member 24 rotates the takeup member 40 in a second moving direction R2 as the first user operating member 24 is moved by the user from the rest position (FIGS. 2 and 3) to the operated position (FIG. 4). On the other hand, in the illustrated embodiment, the second user operating member 26 releases the takeup member 40 such that the biasing element 42 (i.e., a torsion spring) rotates the takeup member 40 in the first moving direction R1 as the second user operating member 26 is moved by the user from the rest position (FIGS. 2 and 3) to the operated position (FIG. 5).

As seen in FIGS. 8 to 11, the bicycle control device 12 further comprises a first base member 44 and a second base member 46 that are at least partially disposed in the internal space 30 and that are pivotally arranged relative to the housing 20 about the first axis A. Thus, the first user operating member 24 is partially disposed in the internal space 30. In the illustrated embodiment, as mentioned above, the first axle 38 defines the first axis A and the takeup axis. The bicycle control device 12 further comprises a first fixing member 48 that fixes the first user operating member 24 to the first base member 44 as discussed below. The bicycle control device 12 further comprises a second fixing member 50 that fixes the second user operating member 26 to the second base member 46 as discussed below.

Here, in the illustrated embodiment, the first user operating member 24 is adjustably mounted to the first base member 44 between a first position (FIG. 13) and a second position (FIG. 14) by using the first fixing member 48 as discussed below. The first and second positions of the first user operating member 24 provide different rest positions of the first user operating member 24. The user contacting portion 24a is spaced from the first axis A by a first distance with the first user operating member 24 fixed at the first position. The user contacting portion 24a is spaced from the first axis A by a second distance with the first user operating member 24 fixed at the second position. The first distance is different from the second distance. The first fixing member 48 fixes the first user operating member 24 to the first base member 44 within the internal space 30 of the housing 20.

Also, in the illustrated embodiment, the second user operating member 26 is adjustably mounted to the base member 46 between a first position (FIG. 16) and a second position (FIG. 17) using the second fixing member 50 as discussed below. Thus, the second fixing member 50 fixes the second user operating member 26 to the second base member 46 at one of at least the first position and the second position. The first and second positions of the second user operating member 26 provide different rest positions of the second user operating member 26.

Figure 10:
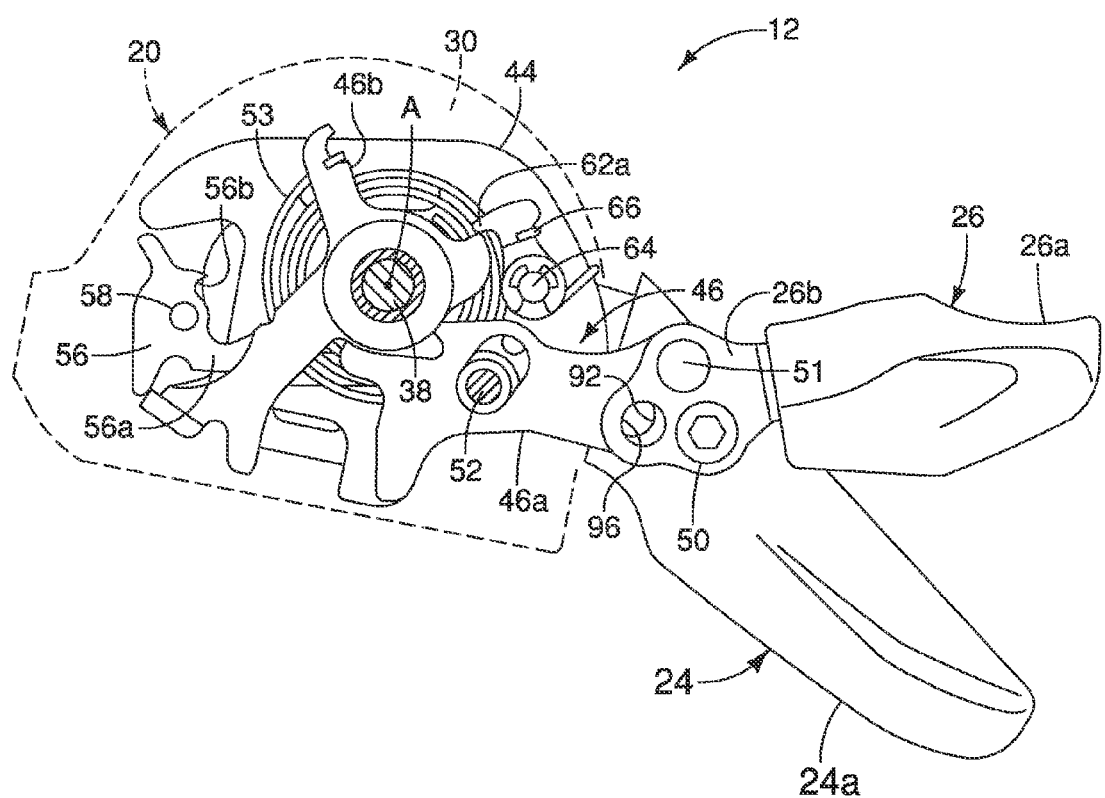
FIG. 10 is a top plan view of the bicycle control device illustrated in FIG. 9, with additional parts removed.
Figure 11:
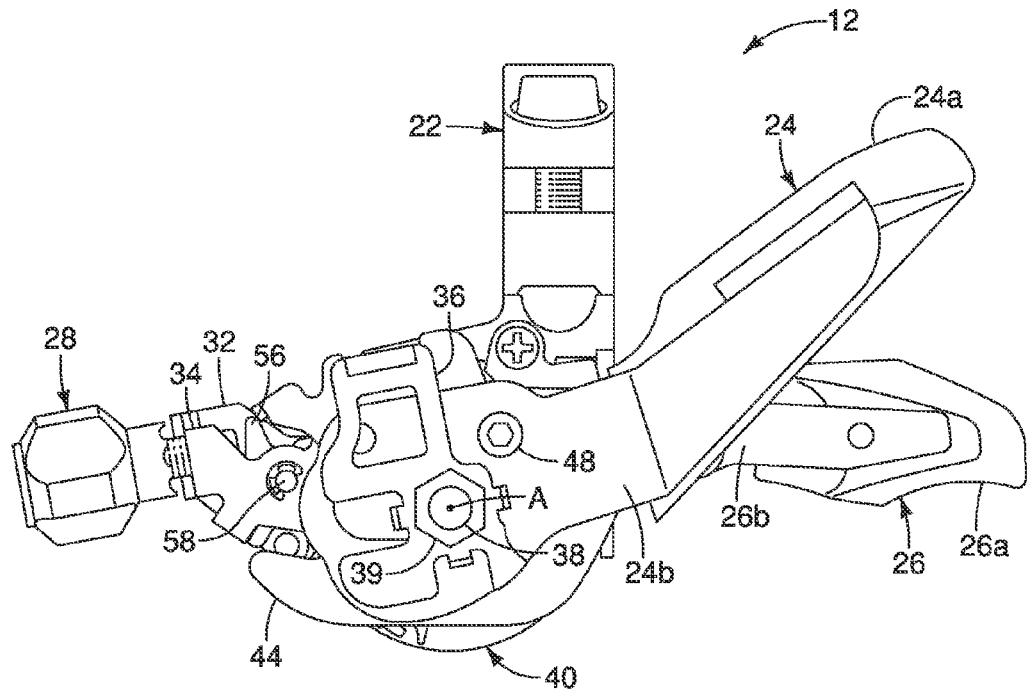
FIG. 11 is a bottom plan view of the bicycle control device illustrated in FIGS. 2 to 5, with the housing removed to show internal parts and both of the first and second user operating members being at the rest position.
Figure 12:
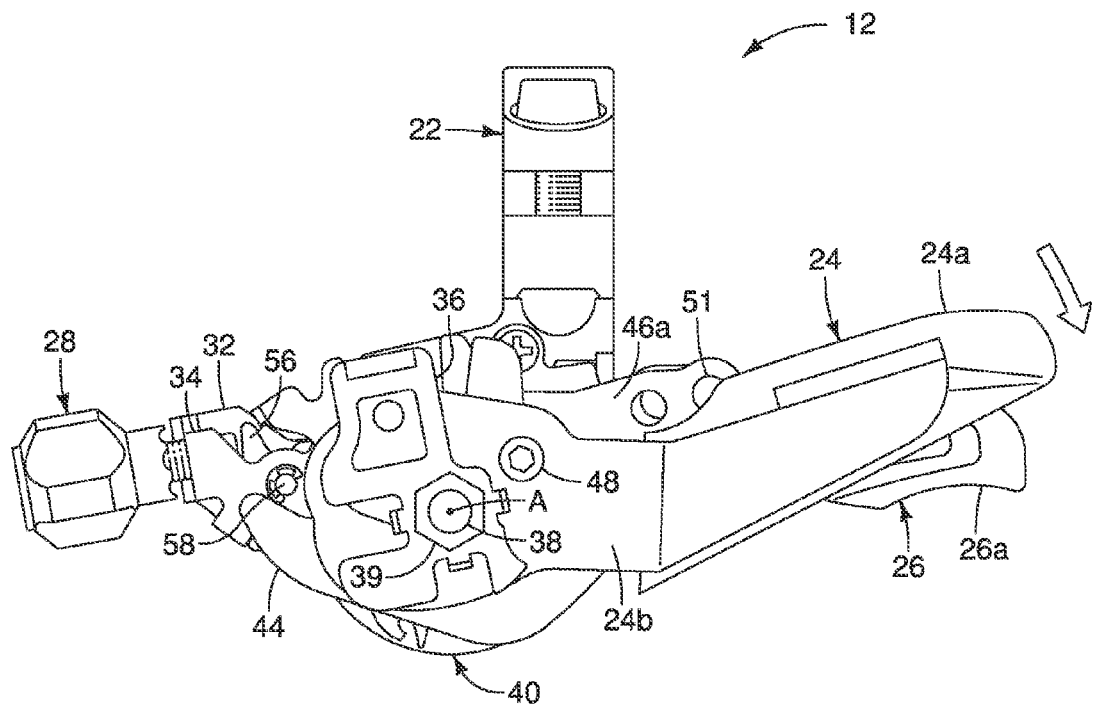
FIG. 12 is a bottom plan view of the bicycle control device illustrated in FIG. 11, with the first user operating member moved to an operated position and the second user operating member being at the rest position.

As seen in FIG. 10, in the illustrated embodiment, the second base member 46 includes a first part 46a and a second part 46b such that the second user operating member 26 can be operated in either direction from the rest position to perform a releasing operation. The first part 46a is pivotally attached to the second user operating member 26 by a pivot pin 51. The second part 46b is pivotally mounted on the first axle 38 to pivot about the first axis A. The first part 46a is interlocked with the second part 46b as seen in FIG. 10. Thus, the first part 46a and the second part 46b pivot together as a unit about the first axis A as the second user operating member 26 is operated in a first actuating direction shown in FIG. 5. When the second user operating member 26 is pivoted in the opposite direction, the first part 46a pivots on a fastener 52, which is used to movably mounted the first part 46a to the second stationary support plate 34, and the second part 46b pivots on the first axis A.

In particular, the fastener 52 extends through a slot in the first part 46a to prevent the first part 46a from separating from the second part 46b. With this configuration, the first part 46a can pivot about the first axis A as the second user operating member 26 is operated in the first actuating direction, and can pivot about the fastener 52 as the second user operating member 26 is operated in a second actuating direction, which is opposite the first actuating direction. Of course, the first part 46a and the second part 46b can be formed as a single piece if it is desirable for the second user operating member 26 to be operated only in the first actuating direction shown in FIG. 5.

As seen in FIG. 10, a biasing element 53 is provided around the first axle 38 for biasing the first and second user operating members 24 and 26 to their rest positions. More specifically, in the illustrated embodiment, the biasing element 53 is a flat coil torsion spring that is coiled about the first axle 38 with one free end disposed in a hole in the first base member 44 and the other free end hooked on the second base member 46. In this way, the first and second base members 44 and 46 are biased in opposite directions to their rest positions. Since the first and second user operating members 24 and 26 are fixed to the first and second base members 44 and 46, the biasing element 53 biases the first and second user operating members 24 and 26 to their rest positions. The biasing element 53 biases the first user operating member 24 in the first moving direction R1 (FIG. 7) about the first axis A, and biases the second user operating member 26 in the second moving direction R2 (FIG. 7) about the first axis A. Thus, the biasing element 53 functions as a return spring for returning the first and second user operating members 24 and 26 from the operated position back to the rest position. As a result, the first and second user operating members 24 and 26 are trigger members that return to their rest position upon being operated and released.

Referring back to FIG. 8, the bicycle control device 12 further comprises a position maintaining arrangement that controls the position of the takeup member 40 in response to operation of the first and second user operating members 24 and 26. The position maintaining arrangement selectively maintains the takeup member 40 in any one of a plurality of holding positions relative to the housing 20. In the illustrated embodiment, the position maintaining arrangement basically includes a positioning member or ratchet 54 and a positioning pawl 56. The positioning member 54 is fixed to the takeup member 40 so that they move together as a unit.

Figure 8:
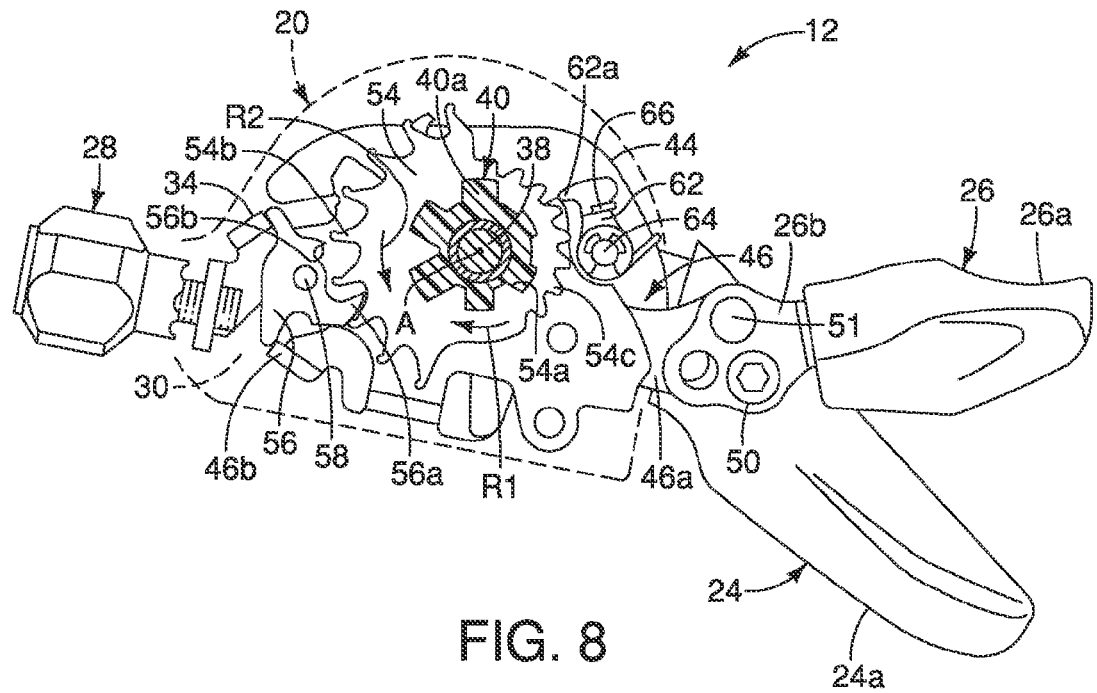
FIG. 8 is a top plan view of the bicycle control device illustrated in FIG. 7, with selected parts removed.

In the illustrated embodiment, the positioning member 54 is a flat plate that is formed from a rigid material such as a metallic material. As seen in FIG. 8, the positioning member 54 has a non-circular opening 54a for receiving a projection 40a of the takeup member 40. The projection 40a mates with the non-circular opening 54a to prevent relative rotation. The positioning member 54 has a peripheral edge that has a plurality of positioning abutments or teeth 54b and a plurality of winding abutments or teeth 54c. The positioning member 54 is rotatably mounted on the first axle 38 to rotate with the takeup member 40 due to the mating configuration mentioned above. Since the positioning member 54 is non-rotatably mounted on the takeup member 40, the biasing element 42 also biases the positioning member 54 in the first moving direction R1 (FIG. 7).

The positioning pawl 56 is pivotally mounted to the housing 20 by a pivot pin 58 that is fixed between the first and second stationary support plates 32 and 34. A biasing element 60 is provided on the pivot pin 58 for biasing the positioning pawl 56 towards in engagement with the peripheral edge of the positioning member 54. The positioning abutments 54b cooperate with the positioning pawl 56 to define the plurality of holding positions of the takeup member 40. In particular, the positioning pawl 56 is provided with a pair of teeth 56a and 56b that selectively engage the positioning abutments 54b to hold the positioning member 54 from rotating under the urging force of the biasing element 42.

Figure 9:
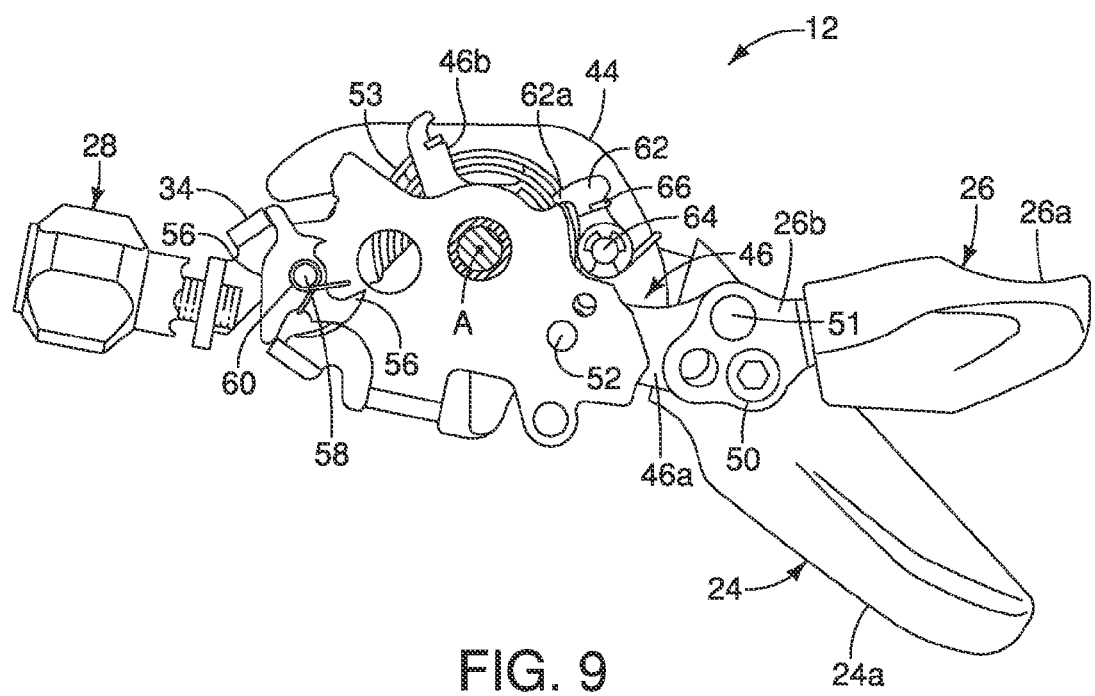
FIG. 9 is a top plan view of the bicycle control device illustrated in FIG. 8, with additional parts removed.

In the illustrated embodiment, the shift unit also includes a winding pawl 62 that is pivotally mounted to the first base member 44 by a pivot pin 64. Since the first user operating member 24 is fixed to the first base member 44 by the first fixing member 48, the winding pawl 62 pivots with the first user operating member 24 as the first user operating member 24 moves between the rest position (FIG. 3) and the operated position (FIG. 4). As seen in FIGS. 8 to 10, a biasing element 66 (only the ends are visible in FIGS. 8 to 10) is provided on the pivot pin 64 for biasing the winding pawl 62 towards in engagement with the positioning member 54. In the illustrated embodiment, for example, the biasing element 66 is a torsion spring that urges the winding pawl 62 towards the peripheral edge of the positioning member 54. However, as seen in FIG. 9, with the first user operating member 24 in the rest position, the winding pawl 62 contacts a peripheral edge of the second stationary support plate 34, which holds the winding pawl 62 out of the path of the winding abutments 54c of the positioning member 54. In particular, a tooth 62a of the winding pawl 62 contacts the peripheral edge of the second stationary support plate 34 while the first user operating member 24 is in the rest position. Once the first user operating member 24 is moved from the rest position, the tooth 62a of the winding pawl 62 rides off the peripheral edge of the second stationary support plate 34 and engages one of the winding abutments 54c of the positioning member 54 due to the urging force of the biasing element 66 on the winding pawl 62. The tooth 62a of the winding pawl 62 engages one of the winding abutments 54c of the positioning member 54 to rotate the positioning member 54 and the takeup member 40 together in the second moving direction R2 (FIG. 7) as the first user operating member 24 is pivoted from the rest position to an operated position. This rotation of the takeup member 40 in the second moving direction R2 pulls the inner cable 16a into the housing 20.

The second part 46b of the second base member 46 is configured as a release member that selectively engages an abutment of the positioning pawl 56 to pivots the positioning pawl 56 as the second user operating member 26 is pivoted from the rest position to the operated position. As a result of this pivoting of the second part 46b of the second base member 46, the tooth 56a disengages from one of the positioning abutments 54b of the positioning member 54 to allow rotation of the takeup member 40 and the positioning member 54 in the first moving direction R1 (FIG. 7). At the same time as the tooth 56a disengages from one of the positioning abutments 54b of the positioning member 54, the tooth 56h moves into the path of the positioning abutments 54b of the positioning member 54. As a result, the tooth 56b stops the rotation of the takeup member 40 and the positioning member 54 in the first moving direction R1.

Figure 13:
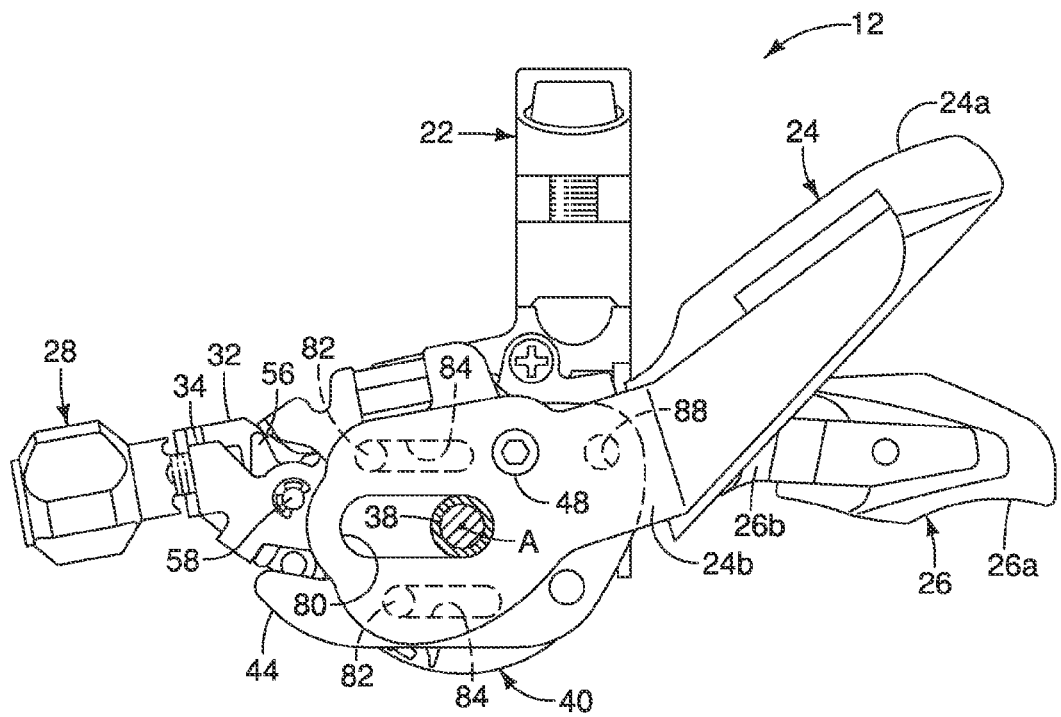
FIG. 13 is a bottom plan view of the bicycle control device illustrated in FIG. 11, with selected parts removed to show the first user operating member fixed to the base member in the first position.
Figure 14:
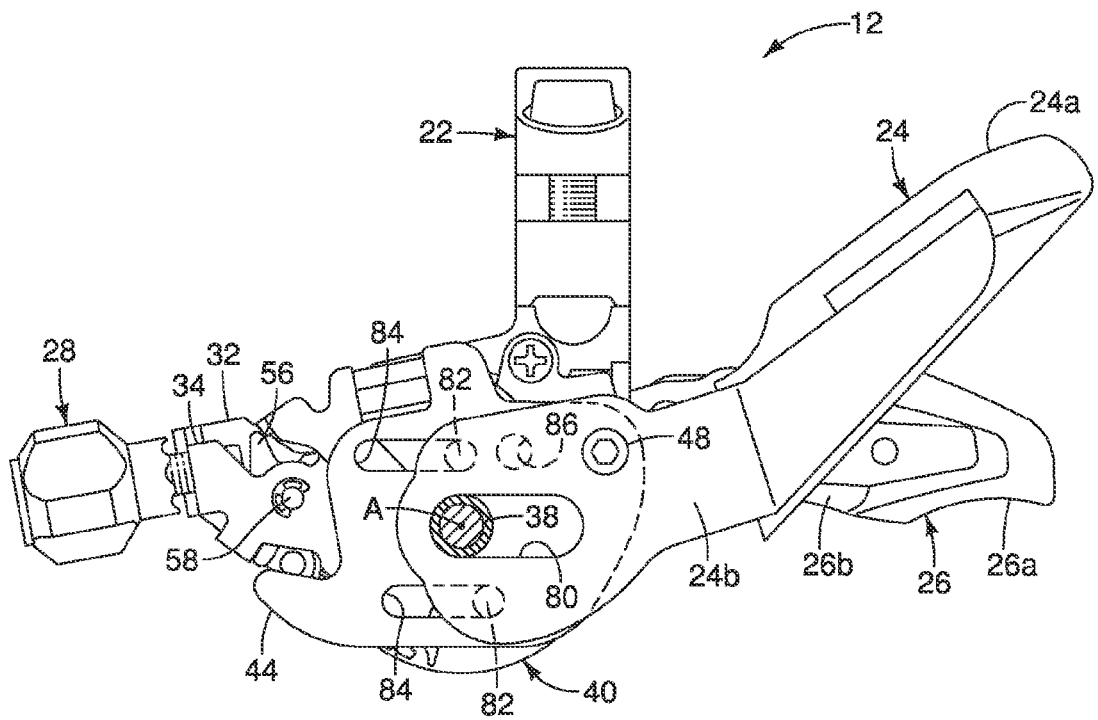
FIG. 14 is a bottom plan view of the bicycle control device illustrated in FIG. 11, with selected parts removed to show the first user operating member fixed to the base member in the second position.
Figure 15:
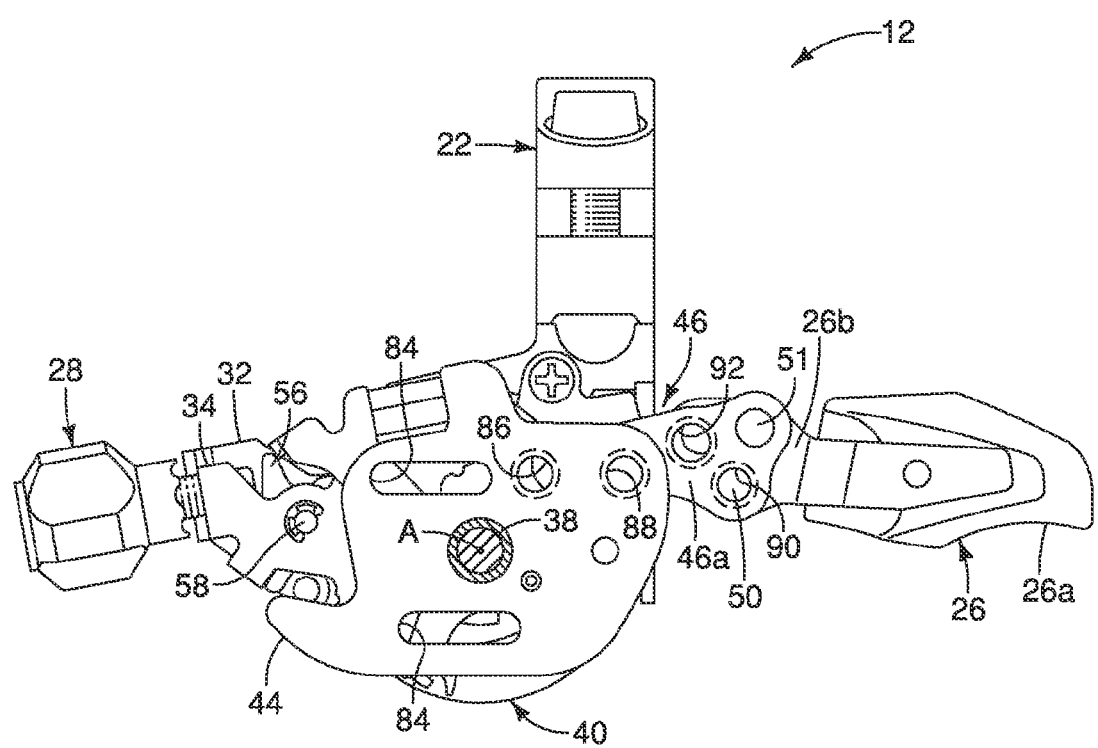
FIG. 15 is a bottom plan view of the bicycle control device illustrated in FIG. 11, with additional selected parts removed to show the base member.

Now referring to FIGS. 13 to 15, the adjustment of the first user operating member 24 to the first base member 44 will now be discussed. As mentioned above, the first fixing member 48 fixes the first user operating member 24 to the first base member 44 at one of at least the first position (FIG. 13) and the second position (FIG. 14). In other words, the first fixing member 48 is used to selectively fix the first user operating member 24 to the first base member 44 in one of the first and second positions as desired by the user. In particular, the first user operating member 24 includes an attachment portion 24b that has an elongated hole 80 through which the first axle 38 passes. This elongated hole 80 allows the first user operating member 24 to move relative to the first base member 44 as the first user operating member 24 is moved between the first position (FIG. 13) and the second position (FIG. 14).

One of the first base member 44 and the first user operating member 24 has a guiding slot 84 and the other of the first base member 44 and the first user operating member 24 has a guiding pin 82 disposed in the guiding slot 84 to prevent relative rotation between the first base member 44 and the first user operating member 24. Here, in the illustrated embodiment, the first base member 44 has a pair of the guiding slots 84 and the first user operating member 24 has a pair of the guiding pins 82. Also one of the first base member 44 and the first user operating member 24 includes at least a first fixing hole 86 and a second fixing hole 88 for selectively receiving the first fixing member 48. Here, in the illustrated embodiment, the first base member 44 has the first and second fixing holes 86 and 88, which are threaded holes. Thus, the first fixing member 48 is a fixing bolt that extends through a non-threaded opening in the first user operating member 24 and is selectively screwed into one of the first and second fixing holes 86 and 88. The first user operating member 24 is disposed at the first position with the first fixing member 48 passing through the first fixing hole 86 as seen in FIG. 13. The first user operating member 24 is disposed at the second position with the first fixing member 48 passing through the second fixing hole 88 seen in FIG. 14.

Figure 16:
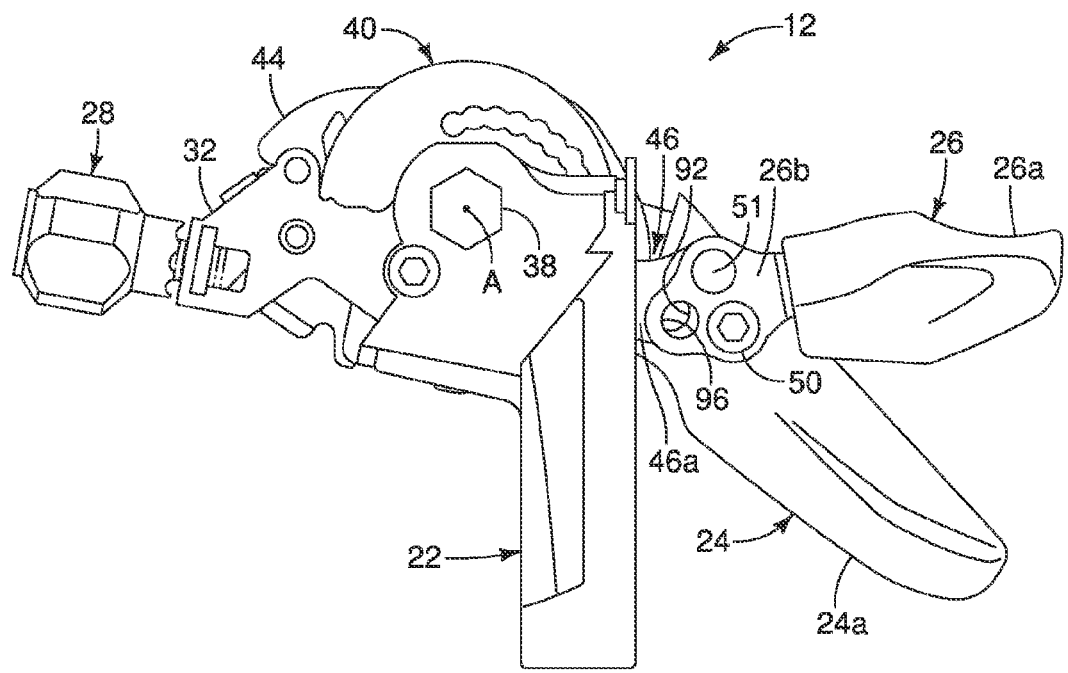
FIG. 16 is a top plan view of the bicycle control device illustrated in FIG. 2, with the housing removed and the second user operating member fixed to the base member in the first position.
Figure 17:
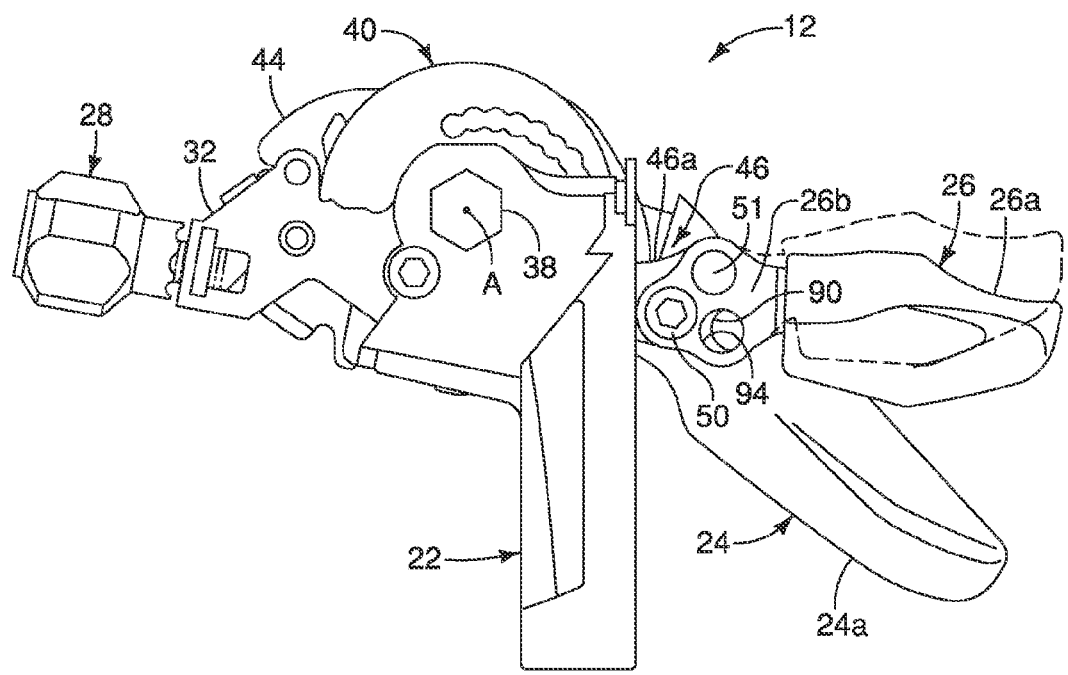
FIG. 17 is a top plan view of the bicycle control device illustrated in FIG. 2, with the housing removed and the second user operating member fixed to the base member in the second position.

Now referring to FIGS. 16 and 17, the adjustment of the second user operating member 26 to the second base member 46 will now be discussed. As mentioned above, the second fixing member 50 fixes the second user operating member 26 to the second base member 46 at one of at least the first position (FIG. 16) and the second position (FIG. 17). In particular, the second user operating member 26 includes an attachment portion 26b that is pivotally attached to the first part 46a of the second base member 46. The first part 46a of the second base member 46 has a first fixing opening or hole 90 and a second fixing opening or hole 92.

The attachment portion 26b has a first positioning opening or hole 94 and a second positioning opening or hole 96. Here, the first and second fixing holes 90 and 92 are threaded holes, while the first and second positioning holes 94 and 96 are non-threaded openings. Thus, the second fixing member 50 is a fixing bolt that extends through one of the first and second positioning holes 94 and 96 in the second user operating member 26 and is selectively screwed into one of the first and second fixing holes 90 and 92. More specifically, the second fixing member 50 passes through the first positioning hole 94, and is screwed into the first fixing hole 90 to fix the second user operating member 26 at the first position as seen in FIG. 16. The second fixing member 50 passes through the second positioning hole 96, and is screwed into the second fixing hole 92 to fix the second user operating member 26 at the second position as seen in FIG. 17.

Figure 18:
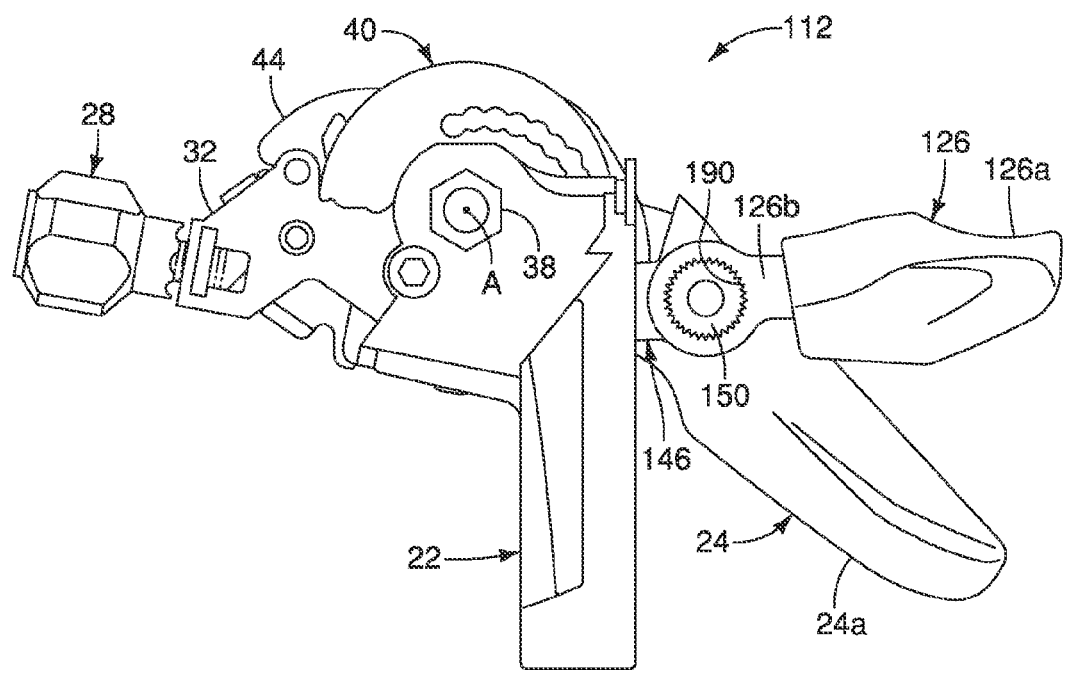
FIG. 18 is a top plan view of an alternative bicycle control device, with the housing removed and the second user operating member fixed to the base member in the first position.
Figure 19:
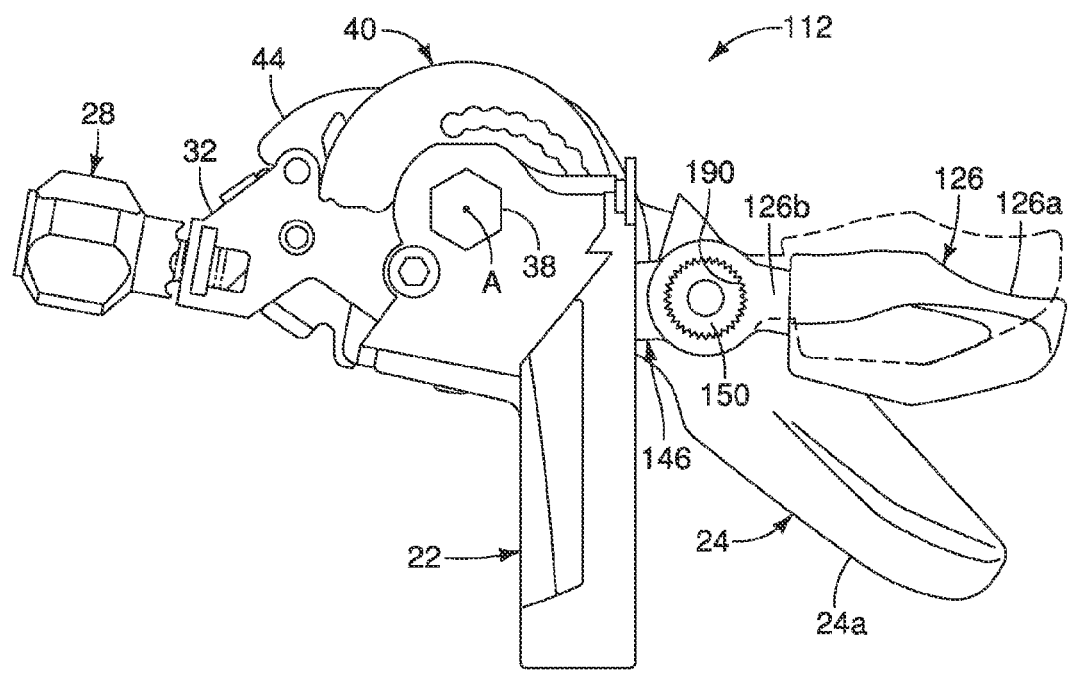
FIG. 19 is a top plan view of the alternative bicycle control device illustrated in FIG. 18, but with the second user operating member fixed to the base member in the second position.

As seen in FIGS. 18 and 19, an alternative bicycle control device 112 is illustrated in accordance with another embodiment. The bicycle control device 112 is identical to the bicycle control device 12 as discussed above, except that the second user operating member 26 and the second base member 46 of the bicycle control device 12 has been replaced with a second user operating member 126 and a second base member 146. More particularly, the only difference between the bicycle control devices 12 and 112 is the adjustment feature of the second user operating member to the second base member. Thus, the parts of the bicycle control device 112 that are identical to the parts of the bicycle control device 12 will be given the same reference numerals.

Here, in the illustrated embodiment of FIGS. 18 and 19, the second user operating member 126 includes a user contacting portion 126a and an attachment portion 126b. The attachment portion 126b is adjustably attached to the second base member 146 so that the second user operating member 126 can be fixed in a plurality of rest positions as needed and/or desired. In this embodiment, the second base member 146 is provided with a non-circular projection 150 and the second user operating member 126 is provided with a non-circular opening 190. The non-circular opening 190 has a plurality of a serrations or splines that mate with a plurality of a serrations or splines of the projection 150. The serrations of the projection 150 and the serrations of the non-circular opening 190 can be mated in a plurality of orientations to adjust the position of the user contacting portion 126a of the second user operating member 126 relative to the mounting member 22. Otherwise, the second user operating member 126 and the second base member 146 are identical to the second user operating member 26 and the second base member 46. Thus, the bicycle control device 112 will not be discussed or illustrated in further detail.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, the following directional terms "forward", "rearward", "front", "rear", "above", "downward", "vertical", "horizontal", "below" and "transverse" as well as any other similar directional terms refer to those directions of a bicycle in an upright, riding position and equipped with the bicycle control device 12. Accordingly, these directional terms, as utilized to describe the bicycle control device 12 should be interpreted relative to a bicycle in an upright riding position on a horizontal surface and that is equipped with the bicycle control device 12. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
a housing having an internal space;
a base member at least partially disposed in the internal space and pivotally arranged relative to the housing about a first axis;
a user operating member movably mounted to the base member to operate a bicycle component as the user operating member is moved from one of a first rest position and a second rest position to an operated position, the user operating member being partially disposed in the internal space and extending out of the internal space farther than the base member, the user operating member having a user contacting portion; and
a fixing member adjustably fixing the user operating member to selectively maintain the user operating member in the first and second rest positions that are established one at a time, the second rest position being different from the first rest position with respect to the housing, the first axis remaining stationary with respect to the housing while the user operating member is in each of the first and second rest positions,
the user contacting portion being spaced from the first axis by a first distance with the user operating member fixed at the first rest position by the fixing member, and the user contacting portion being spaced from the first axis by a second distance with the user operating member fixed at the second rest position by the fixing member, the first distance is different from the second distance.

2. The bicycle control device according to claim 1, further comprising
a first axle defining the first axis, and the user operating member having an elongated hole through which the first axle passes.

3. The bicycle control device according to claim 2, wherein
one of the base member and the user operating member has a guiding slot and the other of the base member and the user operating member has a guiding pin disposed in the guiding slot to prevent relative rotation between the base member and the user operating member.

4. The bicycle control device according to claim 1, wherein
the fixing member fixes the user operating member to the base member within the internal space of the housing.

5. The bicycle control device according to claim 1, further comprising
a takeup member pivotally mounted to the housing about a takeup axis.

6. The bicycle control device according to claim 1, wherein
the user operating member is a cable operating member.

7. The bicycle control device according to claim 1, wherein the housing includes a first cover part and a second cover part, the first cover part being releasably attached to the second cover part.

8. The bicycle control device according to claim 1, further comprising an additional user operating member movably mounted to an additional base member that is at least partially disposed in the internal space to operate the bicycle component in response to movement of the user operating member to an operated position.

9. The bicycle control device according to claim 8, further comprising the additional user operating member has a non-circular opening, the additional base member has a non-circular projection that mates with the non-circular opening to selectively establish a first rest position and a second rest position base on an orientation of the additional user operating member relative to the additional base member.

10. A bicycle control device comprising:

a housing having an internal space;

a base member at least partially disposed in the internal space and pivotally arranged relative to the housing about a first axis;

a user operating member adjustably mounted to the base member and partially disposed in the internal space, the user operating member having a user contacting portion; and a fixing member adjustably fixing the user operating member to the base member, one of the base member and the user operating member including a first fixing hole and a second fixing hole for selectively receiving the fixing member, the user operating member being disposed at a first position when the fixing member is disposed in the first fixing hole, and the user operating member being disposed at a second position with the fixing member is disposed in the second fixing hole.

11. A bicycle control comprising:

a housing having an internal space;

a base member at least partially disposed in the internal space and pivotally arranged relative to the housing about a first axis;

a user operating member adjustably mounted to the base member and partially disposed in the internal space, the user operating member having a user contacting portion;

a fixing member adjustably fixing the user operating member to the base member selectively maintain the user operating member in a first rest position and a second rest position that are established one at a time, the second rest position being different from the first rest position with respect to the housing, the user contacting portion being spaced from the first axis by a first distance with the user operating member fixed at the first rest position by the fixing member, and the user contacting portion being spaced from the first axis by a second distance with the user operating member fixed at the second rest position by the fixing member, the first distance is different from the second distance; and a takeup member pivotally mounted to the housing about a takeup axis, the takeup axis being coaxial with the first axis.

12. The bicycle control device according to claim 11, wherein the user operating member is a cable operating member.

13. The bicycle control device according to claim 11, wherein the housing includes a first cover part and a second cover part, the first cover part being releasably attached to the second cover part.

14. The bicycle control device according to claim 11, further comprising an additional user operating member movably mounted to an additional base member that is at least partially disposed in the internal space to operate the bicycle component in response to movement of the user operating member to an operated position.

15. The bicycle control device according to claim 14, further comprising the additional user operating member has a non-circular opening, the additional base member has a non-circular projection that mates with the non-circular opening to selectively establish a first rest position and a second rest position base on an orientation of the additional user operating member relative to the additional base member.

* * * * *